United States Patent [19]

Betz

[11] Patent Number: 5,245,111
[45] Date of Patent: Sep. 14, 1993

[54] METHOD AND APPARATUS FOR TREATMENT OF LIQUID PHOTOGRAPHIC PROCESSING WASTES

[75] Inventor: Gerd Betz, In den Horben, Fed. Rep. of Germany

[73] Assignee: Eastman Kodak Company, Rochester, N.Y.

[21] Appl. No.: 773,626

[22] PCT Filed: Mar. 13, 1991

[86] PCT No.: PCT/EP91/00472
§ 371 Date: Nov. 12, 1992
§ 102(e) Date: Nov. 12, 1992

[87] PCT Pub. No.: WO91/13834
PCT Pub. Date: Sep. 19, 1991

[30] Foreign Application Priority Data

Mar. 16, 1990 [DE] Fed. Rep. of Germany ....... 4008495
Oct. 5, 1990 [DE] Fed. Rep. of Germany ....... 4031609

[51] Int. Cl.$^5$ .............................................. C25C 1/20
[52] U.S. Cl. .................................. 588/204; 204/109; 204/151; 204/152; 204/252
[58] Field of Search ................ 204/105 R, 109-130, 204/131, 149, 242, 252, 267; 210/681, 683, 748, 758-760; 588/204

[56] References Cited

U.S. PATENT DOCUMENTS 4,217,188  8/1980  Ono ................................... 204/109

OTHER PUBLICATIONS

Mizusawa, "Disposal of Photographic Processing Wastes", Chem. Abs., vol. 81, No. 26, 175657u (1974).

Primary Examiner—John Niebling
Assistant Examiner—C. Delacroix-Muirheid
Attorney, Agent, or Firm—Peter C. Cody

[57] ABSTRACT

A method and an apparatus for treatment of liquid wastes from photographic processes are described, in which the wastes to be treated are
(a) subjected to an oxygen oxidation as well as
(b) an ozone oxidation,
(c) optionally from the oxidized wastes halide ions are removed,
(d) the wastes, from which optionally halide ions are extensively removed, are subjected to an anodic after-oxidation as well as
(e) a cathodic reduction, then
(f) neutralized and
(g) set free from precipitated solids by filtration.

The invention allows an especially effective reduction of damaging substances which are obtained in photographic processes.

35 Claims, 4 Drawing Sheets

METHOD AND APPARATUS FOR TREATMENT OF LIQUID PHOTOGRAPHIC PROCESSING WASTES

The invention refers to a method and an apparatus for the treatment of liquid wastes from photographic processes, which wastes, bound by law, cannot be discharged into waters or into the sewage disposal system without a treatment which is accomplished to remove harmful substances contained in the wastes.

The liquid wastes, which are produced in photographic processes are especially developer, fixing, bleach, bleach-fixing, stop and reducer baths as well as optionally rinsing baths.

As damaging components, which have to be removed, the wastes especially contain metals, as for example silver and iron, sulfur containing compounds, as for example sulfites, and thiosulfates, further ammonium, complexing agents and reducing aromatic organic compounds, as for example hydroquinone, aminophenols as well as phenylene diamine.

The COD values of the liquid wastes to be treated may be above 100,000 g/m$^3$ and the BOD values may be at up to 50 000 g/m$^3$.

The methods for the treatment of liquid wastes from photographic processes, which may be produced in medical centers, studios, film studios, at the radar control and air traffic control, in printing offices, photolabs, hospitals, public imaging centers, reprolabs, printed circuit board producers and so on, which methods are known until now, generally comprise the following steps: electrolytically removing silver, to precipitate residual amounts of silver and other heavy metals by using precipitating agents like H$_2$S or Na$_2$S, oxidizing sulfite and thiosulfate to sulfate, precipitating the produced sulfate as calcium sulfate and stripping off the ammonium nitrogen as ammonia.

A survey of wet chemical methods, which can be used for the treatment of liquid wastes from photographic processes can be found in a Working Paper of the Ministerium für Ernährung, Landwirtschaft, Umwelt und Forsten, Baden-Württemberger, May 1986.

This Working Paper mentions as oxidizing agents for the oxidation of sulfite and thiosulfate to sulfate as well as for the oxidation of organic damaging substances, as for example hydroquinone in desilverized wastes, air oxygen and hydrogen peroxide.

As a further oxidizing agent ozone became known, for example from a publication of the Society of Photographic Scientists and Engineers, Volume 14, No. 4, June–July 1972 and Volume 14, No. 5, August–September 1972 as well as from a publication of T. W. Bober and T. J. Dagon, published in the Journal WPCF, Volume 47, No. 8, 1975, pages 2114–219.

Although by using the methods which became known until now and which have been used until now, an extensive reduction of damaging substances is possible, the requirements with regard to the reduction of damaging substances will be raised more and more as a consequence of the increasing environment consciousness of the people. This means that the maximum values, permissible by law of the individual damaging substances in the liquid wastes will be more and more reduced.

Accordingly, there exists a want for a method, which makes it possible to treat wastes from photographic processes, that means photo-chemical waste waters, with an efficiency as high as possible In the DE-OS 39 21 436, a method is already proposed, which method comprises the following process steps:
1. Introducing wastewater, which is continuously or discontinuously obtained, into a storage container;
2. as an auxiliary means: a biological treatment to decompose reactive substances;
3. Oxygen aeration by using air or an other oxygen containing gas for the treatment of those components of the waste water which are more easily to oxidize;
4. the addition of ozone for a sufficient oxidation of those substances which are more difficult to degrade with a simultaneous pH control in two or more reactor steps and
5. catalytic aftertreatment by a chemical and/or catalyzed photo-chemical OH radical reaction.

The kernel of said older method is the combination of a biological treatment with two oxidizing steps. The catalytic aftertreatment by chemical and/or catalyzed photochemical OH radical reaction in step 5 is not illustrated in the DE-OS 39 21 436.

The problem to be solved by the present invention is to provide a method and an apparatus for the treatment of liquid wastes from photographic processes, which method and apparatus allow an especially effective reduction of damaging substances, so that this method fulfils highest requirements. Particularly, the following should be reached:

(a) the reduction of the COD value by preferably more than 90%;

(b) an oxidation of sulfite and thiosulfate to sulfate, which oxidation is as complete as possible;

(c) the degrading of complexing agents, as for example (NH$_4$)FeEDTA, EDTA and PDTA as well as of complexes, as for example [Fe(CN)6]$^{4-}$; which degrading is as effective as possible;

(d) the effective reduction of the ammonium content;

(e) the elimination of the iron content, which elimination is as complete as possible and (f) the elimination of those reaction products, which can be detected by a AOX (adsorbable organic halide compounds)—determination, which elimination is as complete as possible.

Likewise, the new method should be characterized by a great versatility, that means, the new method should be useful for the treatment of the most different liquid wastes from photographic processes, for example the treatment of spent or used X-ray developers, fixing bathes, repro developers, film and paper developer solutions, bleach-fixing solutions and the like.

According to the present invention, this problem is solved by a method, in which the wastes are
(a) subjected to an oxygen oxidation as well as
(b) an ozone oxidation, in which method
(c) optionally from the oxidized wastes halide ions are removed,
(d) the wastes, from which the halide ions are optionally extensively removed, are subjected to an anodic after-oxidation as well as
(e) a cathodic reduction, then
(f) neutralized and
(g) set free from precipitated solids by filtration.

The method according to the present invention allows the treatment of diluted wastes, that means wastes, which after collecting in the plant can be diluted with washing waters or city supply water to about the 10 to 20-fold of their originally volume as well as the treatment of concentrated wastes as obtained in the plant. The apparatus for the treatment can also be fed with concentrated or diluted wastes, which are mixtures of the most different bathes, for example mixtures of the wastes of thiosulfate free bathes, for example developer bathes and thiosulfate containing bathes, for example fixing bathes and bleach-fixing bathes. However optionally it may be advantageous to optimize the method by feeding the thiosulfate containing wastes separately from the wastes, which are free or essentially free of thiosulfate into the treating apparatus and by subjecting said thiosulfate containing wastes to an additionally anodic oxidation, before they are subjected to the ozone-oxidation.

It was surprisingly found that removing halide ions in step (c) can simplify the anodic after-oxidation and that as a consequence of removing halide ions, likewise considerable savings in energy and time in the following anodic after-oxidation step can be achieved.

This is especially true for the treatment of diluted wastes.

According to a first preferred embodiment of the method of the invention the wastes to be treated are subjected to
(a) an oxygen oxidation as well as
(b) an ozone oxidation and
(c) from the oxidized wastes halide ions are removed,
(d) the wastes from which the halide ions are extensively removed are subjected to an anodic after-oxidation as well as
(e) a cathodic reduction, then
(f) neutralized and
(g) set free from precipitated solids by filtration.

According to a second preferred embodiment of the invention, in which embodiment concentrated, that means undiluted wastes are treated, the wastes treated in method steps (a) and (b) are directly subjected to method steps (d) to (g).

It is also preferred to subject thiosulfate containing wastes after an oxygen oxidation according to step (a) and before an ozone oxidation according to step (b) to an anodic oxidation.

Accordingly according to a third preferred embodiment of the invention wastes which are free from thiosulfate or which are essentially free from thiosulfate on the one hand and thiosulfate containing wastes on the other hand are separately subjected to an oxygen oxidation according to step (a) and the thiosulfate containing wastes are anodically oxidized before they are subjected to the ozone oxidation according to step (b) and both differently treated wastes, optionally after a further common oxygen oxidation step are combined and subjected to the ozone according to step (b).

In the following the individual process steps are described more in detail:

(a) Oxygen oxidation

The oxygen oxidation (aeration) is useful for the oxidation of damaging substances, which are comparatively easy to oxidize, especially sulfite. It is appropriate to use air as the oxygen carrier for the oxygen oxidation, preferably by blowing air into the wastes to be treated. It has been shown that the air distribution is of great importance. It is especially preferable to accomplish the oxygen oxidation for example by blowing compressor air into the wastes by using a gas distributor which distributes the air as fine as possible. The progress of the oxygen oxidation can be pursued, for example by a continuous determination of the sulfite content. It is preferred to treat the wastes in step (a) with air or an other oxygen containing gas, until 80 to 90% of the sulfite, originally present are oxidized to sulfate.

According to a preferred embodiment of the method according to the invention, the exhaust gases obtained during ozone oxidation are introduced into step (a) as oxidizing agent. By this way, residual amounts of ozone, present in the exhaust gas of step (b) are rendered harmless.

Preferably, the exhaust air from step (a) can be subjected to a purifying process in which process especially liberated $NH_3$ can be separated.

By the use of an ozone-analyzer which is installed in the exhaust air of step (a) it can be guaranteed that all ozone from step (b) contained in the exhaust gas of this step, is spent in step (a). The same analyzer can be used for controlling the surrounding air.

(b) Ozone oxidation

The oxidation capability of the oxygen is insufficient for the oxidation of many compounds which have to be removed from the liquid wastes. Particularly, thiosulfate, ammonium and the organic developer agents cannot be sufficiently oxidized by an oxygen.

Now it was found that the compounds which are not yet oxidized in step (2) can effectively be oxidized by an ozone oxidation. This is particularly true for thiosulfate, ammonium as well as the most different organic compounds which are present.

It is appropriate to accomplish said ozone treatment until the COD value of the wastes is reduced by 60 to 70%.

Said ozone treatment can be accomplished by blowing an oxygen-ozone mixture, produced in a conventional ozone generator, into the wastes which have to be treated.

Said ozone generator can be fed with oxygen gas generated from liquid oxygen and/or pressurized air and residual gases, which are obtained during the ozone oxidation.

According to a preferred embodiment of the invention, the ozone treatment is combined with an UV-light treatment and optionally with the addition of catalytic amounts of $H_2O_2$.

The degree of the oxidation is determined by the amount of ozone added per time unit and the residence time of the ozone.

(c) Removing of halide ions

The purpose of this process step is to extensively remove halide ions which may disturb the following anodic after-oxidation in step (d). It was found that an after-oxidation of wastes especially diluted wastes containing halide ions results in a poor current efficiency, which efficiency can be improved by the extensive elimination of halide ions, especially chloride and bromide ions.

Preferably, the elimination of the halide ions is accomplished by using one of the common known basic, preferably strong basic, ion-exchange resins.

Useful ion exchange resins are for example those of the Amberlite-type (Rohm and Haas) and of the Lewatite-R-type (Bayer AG).

By the use of such an ion-exchange resin the halide ion concentration can be reduced, for example to less than 10% by weight of the original amount.

The exchange resins, which are used, can be contained in common columns, through which the wastes to be treated are led. The regeneration of the exchange resins can be accomplished for example by using a sodium bicarbonate solution or diluted sulfuric acid.

(d) Anodic after-oxidation

The anodic after-oxidation which is accomplished in one or several electrolytic cells, is to complete the oxidation and to further reduce the COD value to the desired order of magnitude of about 10% by weight of the original value of the untreated wastes. The anodic after-oxidation is especially for the purpose of a quick oxidation of those damaging substances which withstood the first two oxidation steps (a) and (b). As a matter of fact, it is possible by using appropriate electrolytic cells, the anodes of which consist of a suitable material, to oxidize residual amounts of compounds, which are difficult to oxidize, as for example aliphatic compounds, including those which have been produced in oxidation step (b), at a comparatively high overvoltage.

A separation of the anode compartment from the cathode compartment is necessary. Preferably for the separation of the anode compartment from the cathode compartment a diaphgram is used. The optimum current strength used in a particular case, depends on the conductivity, i.e. on the salt concentration of the compounds to be oxidized.

For the accomplishment of this process step the most different electrolytic cells comprising corrosion resistent electrodes are useful.

According to an especially preferred embodiment of the invention, electrolytic cells comprising anodes prepared from titanium and coated with a noble metal, for example platinum and/or iridium, which electrodes are especially corrosion resistant, are used. Such cells are commercially available, for example under the name enViroCell ® (available from Deutsche Carbone).

(e) Cathodic reduction

The cathodic reduction is primary for destroying absorbable organic halide compounds (AOX) which may be present optionally. Preferably, the cathodic reduction is accomplished in the same electrolytic unit in which also the anodic oxidation is accomplished, in which case of course instead of the anode compartment the cathode compartment is used. A useful cathode material which can be used is graphite which is also used in the above-mentioned commercially available cell.

(f) Neutralization

The wastes, treated in the cathodic reduction step are acidic. Generally, they have a pH from about 1 to 2. Essentially, they contain sulfate, iron ions and residual substances which can be biologically degraded very easily. The neutralization can be accomplished by the addition of alkaline reacting substances, as for example NaOH or $Na_2CO_3$.

The slurries, precipitated in step (f) during neutralization are filtered off and sent to a station in which the solids are treated. The waste water, free of precipitates, can then be directed into the sewage disposal system.

DRAWINGS

The drawings are to illustrate the invention. In the drawings, the following is shown in:

FIG. 1 a schematic representation of the sequence of the particular process steps in case of diluted aqueous wastes;

FIG. 2 a diagram showing the thiosulfate degradation of a diluted mixture of a black and white developer and a fixing bath in relation to the current strength;

FIG. 3 a diagram showing the COD degradation of a diluted mixture of a black and white developer and a fixing bath in relation to the current density;

FIG. 4 schematic representation of the sequence of the particular process steps in case of treatment of separately collected undiluted wastes containing thiosulfate and no containing thiosulfate.

According to FIG. 1, the liquid wastes, collected in the storage tank 1 were fed through line 2 into the tank 3, in which the oxygen oxidation is accomplished, for example by blowing in air, which is fed through line 4. The air can be mixed with exhaust air 5 from the ozone oxidation, which exhaust air may optionally still contain traces of ozone.

After the oxygen oxidation the waste waters to be treated were fed through line 6 into reaction tank 7 and subjected to an ozone treatment. Instead of one reaction tank for the ozone treatment, optionally several tanks can be used.

The ozone, which is used, is produced in the ozone generator 8 in a pure oxygen stream, which stream is obtained from liquid oxygen 9. The ozone is fed through line 10 as a ozone-oxygen mixture into reaction tank 7 and introduced into this tank from below and is contacted with said waste water as intensively as possible. In that embodiment, in which several tanks are used, which are connected in series, the ozone-oxygen mixture is introduced in each of the tanks. Optionally, the ozone treatment can be amplified by the simultaneous exposure to UV-light. For this purpose, UV lamps of sufficient strength can be installed in reaction tank 7. In that embodiment, in which several tanks are used, said UV lamps are preferably installed in the tank of the last treatment step or can be used according to the so-called by-pass method.

Optionally catalytic amounts of $H_2O_2$ can be fed into the reaction tank with the installed lamps to amplify the effect of the UV light.

The waste waters subjected to the ozone treatment are then fed through line 11 into an ion-exchange column 12, in which halide ions, especially chloride and bromide ions are removed. Instead of using one exchange column, optionally several columns can be used, which can be connected parallel or in series. Said ion-exchange columns can be regenerated according to well-known methods, for example by using a $NaHCO_3$ solution or by using diluted $H_2SO_4$, which can be introduced through line 13.

The waste water, from which the halide ions are extensively removed, is then transported to the anodic oxidation through line 14. Said anodic oxidation step is accomplished in the electrolytic cell 15. Instead of one electrolytic cell optionally several electrolytic cells can be used, which can be parallel or in series.

Thereafter, the waste water is fed over line 16 into a further electrolytic cell 17, in which the waste water is subjected to the cathodic reduction. However, the use of two electrolytic cells is not necessary. On the contrary, it is also possible, to accomplish anodic oxidation and cathodic reduction in only one electrolytic cell which comprises an anode compartment and a cathode compartment, which are separated from each other by a diaphragm.

Instead of using one electrolytic cell for the cathodic reduction, as well as in the case of the anodic oxidation, several electrolytic cells can be used.

After the cathodic reduction, the waste water is directed through line 18 to the neutralization tank 19, in which tank there is introduced a neutralization agent through line 20. Said neutralization tank 19 is provided with a pH control 26 for pH adjusting and metering the neutralizing agent, as well as with a stirrer. Said neutralizing tank may have one or two compartments for a rough and a fine neutralization.

The slurry of precipitated substances obtained in the neutralizing step is then pumped through line 21 to the settling or filter station 22, in which station the precipitated solids are separated from the liquid. The separated solids were then fed into the solids treatment station 23. The waste water, freed from solids is then fed into the neutralization tank 19 through line 24, from which tank the waste water is withdrawn through line 25 and sent into the sewage disposal system.

The regenerating agents from the halide removing step 12 can be fed into the neutralization tank 19 through line 27.

The exhaust air leaving tank 3 can be fed into an exhaust air cleaning station 29 through line 28 from which station the exhaust air can be released through line 30 into the atmosphere.

The cleaning of the exhaust air as well as the ambient air of the station can preferably be controlled by using a ozone monitoring system 31.

Figure 1:
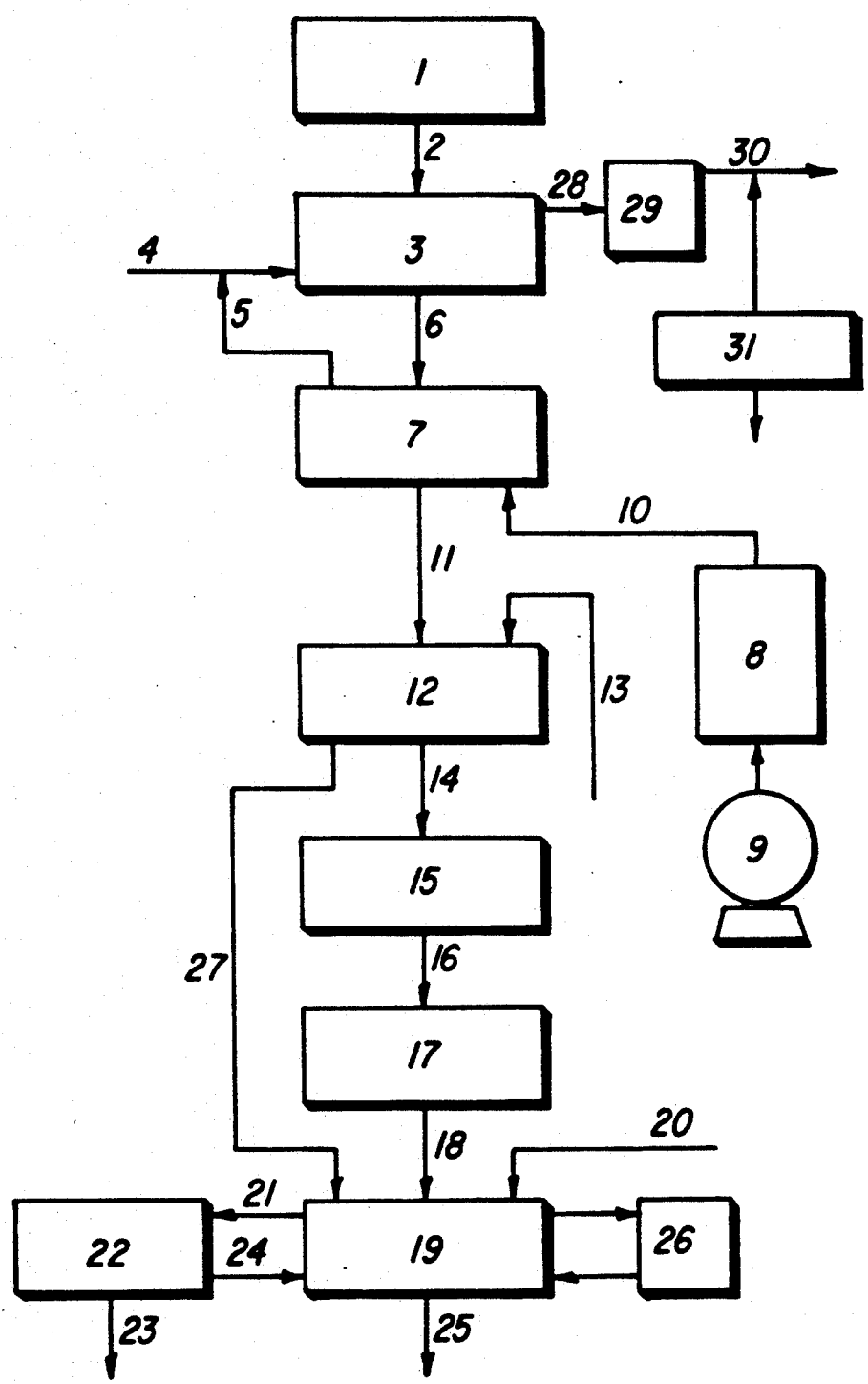
Figure 2:
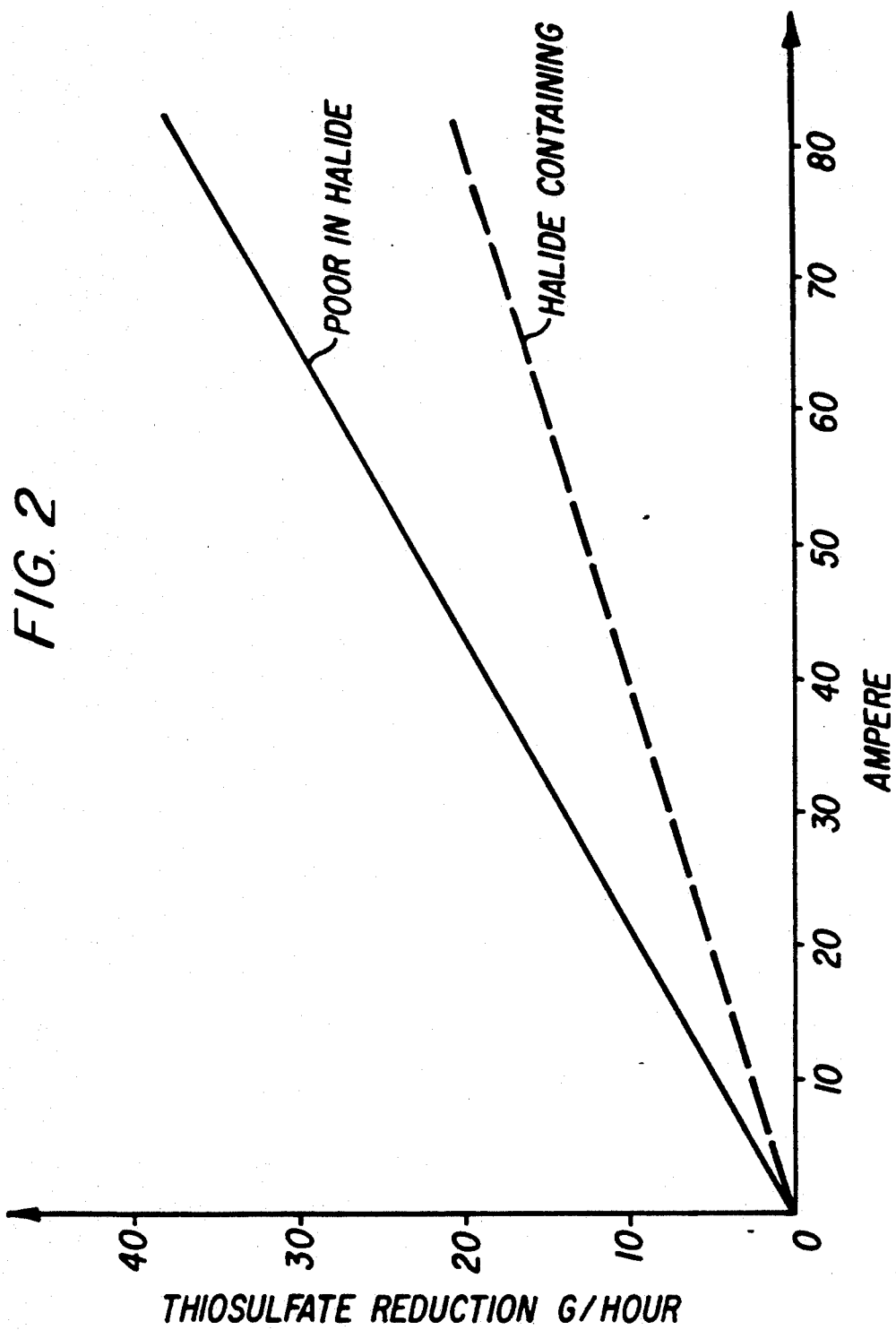
FIGS. 2 and 3 are to illustrate the reduced energy input during the anodic afteroxidation by using a liquid residue, from which the halide ions have been removed by an ion-exchange treatment. The tested waste waters contained in case (a) 1250 mg halide ions per liter and in case (b) 120 mg halide ions per liter.
Figure 3:
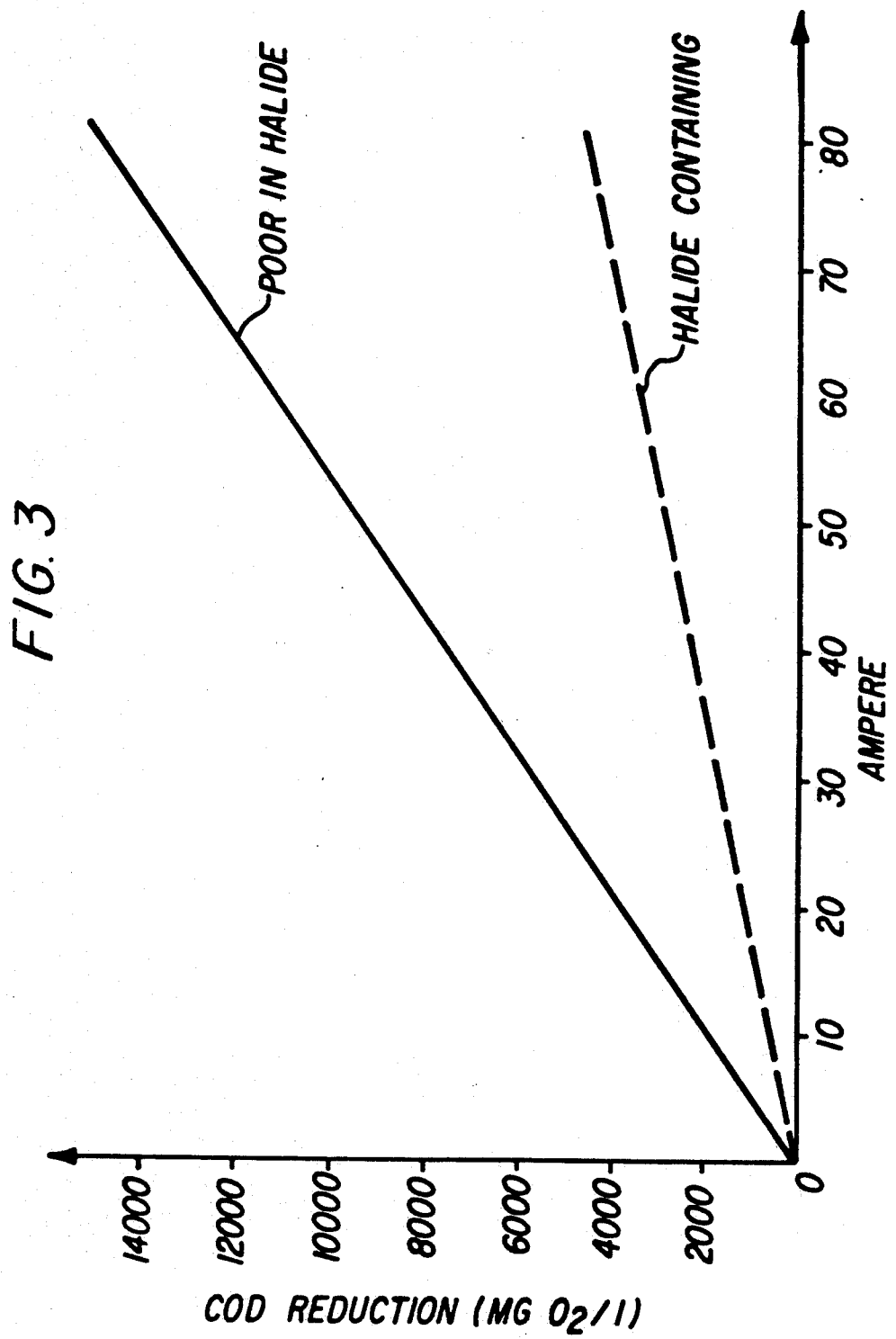

The developer wastes of a photolab collected in the storage tank 32 and the fixing bath/bleach fixing bath wastes of the photolab collected in the storage tank 33 were continuously fed through lines 34 and 35 into the aeration stations 36 and 37, in which the wastes are subjected to an oxygen oxidation by use of compressed air. The wastes, treated in the aeration station 37 were then fed through line 38 into the electrolysis station 39, in which station they are subjected to an anodic oxidation. The wastes, withdrawn from the electrolysis station 39 through line 40 were then fed through line 42 to the aeration station 43 together with the wastes, withdrawn from aeration station 36 through line 41, in which station 43 an after-aeration (after-oxidation) with oxygen was accomplished. It is appropriate to use oxygen with a residual ozone content, which is obtained in the following ozone oxidation container 45, into which the aerated wastes are fed over line 44. The mixture of oxygen and residual ozone can then be fed through line 46 from the ozone oxidizing station 45 into the aeration station 43.

The wastes subjected to the ozone oxidation in the ozone oxidation tank 45 are then transported through line 47 into a further ozone oxidation tank 48, in which an ozone treatment is accomplished, which is supported by UV-light. An oxygen/ozone mixture is added to said ozone oxidation tank 48 through line 49, which mixture is produced in the ozone generator 50. Said ozone generator 50 is fed with gaseous oxygen from a container containing liquid oxygen. Alternatively or additionally gaseous oxygen from the aeration station 43 can be fed into said ozone generator 50 through lines 52,53,54. Preferably this gaseous oxygen is passed through an absorber or exhaust air washer 55 and a dryer 56, for example a silica-gel dryer, for obtaining a clean dry gas. Said absorber may be an activated coal absorber.

From the ozone oxidation tank 48 the wastes are withdrawn through line 57 and optionally introduced into the ion exchanger 58, from which the wastes are withdrawn through line 59. The treatment of the wastes in said ion exchanger depends on the concentration of the wastes, that means said treatment can be appropriate or one can renounce on it. The wastes are then transported through line 59 to the electrolysis station 60 in which they are subjected to the anodic oxidation. The cells of the electrolysis station may be of the same type as the cells of the electrolysis station 39. The wastes withdrawn from electrolysis station 60 are then re-circulated into the electrolysis station 39, in which they are subjected to a cathodic reduction. The wastes withdrawn from electrolysis station 39 through line 62 are then fed into the neutralization tank 63 in which they are neutralized. Preferably the neutralization is accomplished by the addition of a caustic soda solution aiming for a pH of about 7 to about 8. Thereafter the wastes withdrawn through line 64 are fed into the filter station 65, in which precipitates, especially consisting of iron hydroxides are filtered off. Optionally however the wastes withdrawn through line 64 can be fed into a precipitating tank 66 before they are transported to the filter station, in which tank calcium sulfate is precipitated by the addition of $Ca^{++}$. The wastes filtered off in the filter station 65 can be withdrawn through line 67 and collected and regenerated in a storage tank 68. The liquid processed wastes obtained in the filter station 65 may be disposed through line 69 into the sewerage system.

According to a preferred embodiment of the method of the invention the method can be combined with an exhaust air purification. For this purpose it is possible for example to feed the exhaust air from the aeration stations 36,37 and 43 through lines 70,71 and 72 into the collecting line 73, through which the exhaust air is fed into the exhaust air cleaner 74, in which $NH_3$ is removed from the exhaust air.

According to a further preferred embodiment of the method of the invention there is provided an ozone monitoring system of the exhaust air and the surrounding air through line 76 by means of a ozone monitoring apparatus 75, which switches off the ozone generator 50 if a predetermined ozone concentration value is reached. Preferably there is also provided a pressure monitoring system 77 in lines 38 and 61 to monitor the corresponding process streams. Recovery and flushing waters containing bicarbonate which are fed into the ion exchanger 58 through line 58a, may be fed into line 69. Through line 81 $H_2O_2$ can be fed into the ozone oxidation tank 45.

Optionally compressed air can be fed into the ozone generator 50. Exhaust air from the ozone oxidation tank 48 can be introduced into the ozone oxidation container 45 through line 80.

Preferably the electrolysis stations 39 and 60 as well as the ozone oxidation tank 48 are provided with pH-monitoring systems. The transportation of the wastes through the plant is accomplished by pumps, which for reason of simplicity are not shown in FIG. 4.

The following examples are to further explain the invention. Example 1 describes the treatment of diluted liquid wastes according to the schematic representation of FIG. 1. Example 2 describes the treatment of undiluted wastes according to the schematic representation of FIG. 4.

EXAMPLE 1

The waste to be treated was a diluted mixture of a black and white developer and an electrolytically desilverized fixing bath. Said mixture contained:
as developer substances: hydroquinone and phenidone, as complexes: hexacyanoferrate and EDTA, as inorganic salts: bromide, sulfate, carbonate, thiocyanate, sulfite and thiosulfate as well as ammonium and silver (in traces).

The waste was treated batch wise. The volume of one batch was 200 liter.

Finely devided compressor air was introduced into the container 3 within a period of 48 hours, making use of the night hours. Further finely divided exhaust air 5 from process step (b) was fed into the container 3. As a consequence of these measurements, the sulfite content was reduced from 1900 mg $SO_3/l$ to 390 mg $SO_3/l$. Corresponding amounts of sulfate were produced.

The requirement for chemical oxygen (COD) changed only unessentially from 4800 mg $O_2/l$ to 4200 mg $O_2/l$. Thiosulfate and other parameters remained unchanged in this step, with the exception of ammonium, which at a pH of 8.4 was partly driven out. The $NH_4$-N content was reduced from 840 mg/l to 700 mg/l.

In the next process step (b), the waste water which was oxidized with oxygen in step (a) was subjected to an ozone oxidation for 10 hours. Into the ozone reactor 7 an ozone-oxygen mixture was introduced from below. Said mixture was generated in an ozone generator 8 from evaporated liquid oxygen by a silent electric discharge. At this, the waste water was circulated from the container 3 to the ozone reactor 7.

In this process step, it is of importance to control the exhaust air of process step (a) and to control the air which surrounds said ozone reactor 7, by using the ozone analyzer 31 with a limit switch point of 0.2 mg $O_3/m^3$. If this value is exceeded, the ozone generator is switched off.

With regard to the ammonium degradation, it was of importance that during about two third of the ozone oxidation step the pH was maintained at about 8 and only after this time dropped down to a value of 2 after switching off the reactor.

As a consequence of the ozone oxidation in step (b) the following changes could be noted:
COD reduction from 4200 to 1700 mg $O_2/l$;
sulfite reduction from 390 mg $SO_3/l$ to substantially zero;
thiosulfate reduction from 2000 mg $S_2O_3/l$ to substantially zero;
ammonia reduction from 700 mg to 220 mg $NH_4$-N/l.

Further the cyanoferrate complex was cleaved. Free iron in acidic medium was present in a concentration of about 100 mg/l. Moreover, EDTA was reduced from 85 mg/l to 8 mg/l.

To achieve a better current efficiency and a treating time which is as short as possible in process step (d), process step (c) was accomplished before process step (d). In process step (c) the bromide content of the waste water was reduced from 2.5 g/l to about 0.2 g/l. This result was achieved by the use of an ion exchange column filled with 10 l of a strong basic ion-exchange resin of the Amberlite-type. The waste water flew through this resin downwards. As regenerating agent for the resin a 2% sodium bicarbonate solution was used. The other components of the waste water remained substantially unchanged during this process step.

For the following 18 hours afteroxidation in process step (d) a common electrolytic cell of the type en-Virocell® ER/1TC-KE (available from Deutsche Carbone) was used. Said cell was provided with a ceramic diaphragm, a graphite cathode and an anode of titanium, coated with a noble metal. A voltage from 5–7 volts/40–70 Amp. was applied and as the cathode liquid sulfuric acid of a concentration of 2% was used. The waste water was circulated through the anode compartment. During this process step, the following changes were obtained:
COD reduction from 1700 to 750 mg $O_2/l$;
$NH_4$- reduction from 200 to 130 mg $NH_4$-N/l;
EDTA could not be detected anymore.

Because during the ozone oxidation in step (b)—as a consequence of the present halide—there was a measurable AOX value of about 10 mg/l, the anodically oxidized waste water was subjected in process step (e) to a cathodic reduction of about 18 hours. For this treatment, the same eletrolytic cell was used, with the only difference that now the liquid by the use of a pump was circulated through the cathode compartment under the same eletrical conditions as used in process step (d).

By this, the AOX value was dropped below the detection limit (<1 mg/l).

The silver traces contained in the waste water turned out as necessary for the reduction. However they were removed in process step (e) at the cathode down to a value of 0.1 mg/l.

The last process step consists of a neutralization of the acidic waste water to a pH of 7.5 by use of sodium hydroxide solution according to a one-step technique. At a slow addition of sodium hydroxide solution the liquid was continuously pumped through a filter, in the course of which the iron precipitated as hydroxide as removed. The residual amount of iron in the waste water was 12 mg/l.

The results obtained in the single process steps are summarized in the following table.

TABLE

| Parameter | untreated | a | b | c | d | e | f |
|---|---|---|---|---|---|---|---|
| COD | 4800 | 4200 | 1700 | 1700 | 750 | 750 | 750 |
| Sulfite ($SO_3$) | 1900 | 390 | ≈0 | 0 | 0 | 0 | 0 |
| Thiosulfate ($S_2O_3$) | 2000 | 2000 | ≈0 | 0 | 0 | 0 | 0 |
| EDTA | 85 | 85 | 8 | 8 | 0 | 0 | 0 |
| [Fe (CN)$_6$]—Fe | 100 | 100 | 0 | 0 | 0 | 0 | 0 |
| Fe | 0 | 0 | 100 | 100 | 100 | 100 | 12 |

TABLE-continued

| Parameter | untreated | a | b | c | d | e | f |
|---|---|---|---|---|---|---|---|
| NH$_4$—N | 840 | 700 | 220 | 220 | 130 | 130 | 130 |
| AOX | 0 | 0 | 15 | 15 | 15 | 0 | 0 |
| Bromide | 2500 | 2500 | 2500 | 200 | 200 | 200 | 200 |
| pH | 8,4 | 8,4 | 8,4–8,0 8,0–3,0 | 3,0 | 1,0 | 3,0 | 7,5 |

EXAMPLE 2

Figure 4:
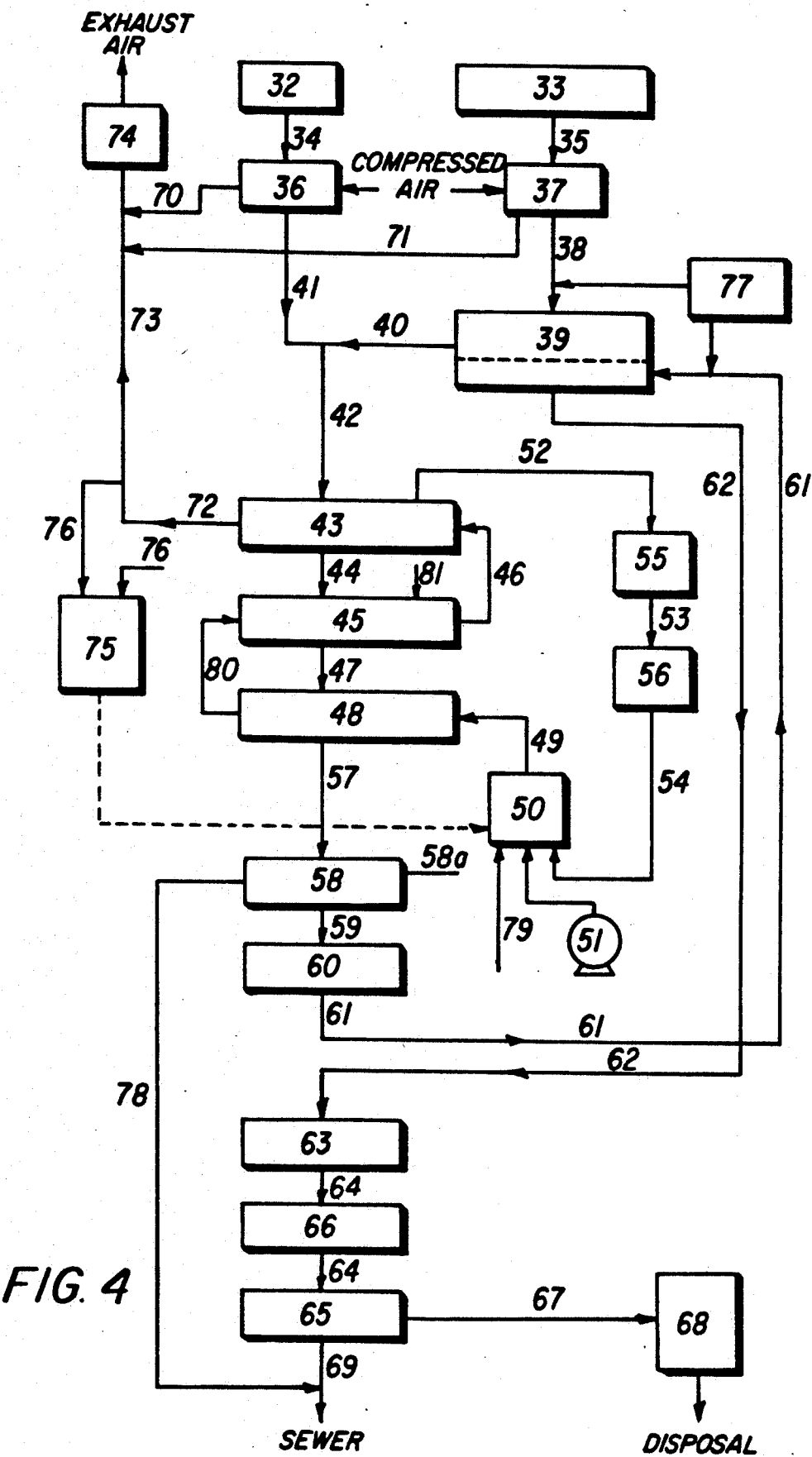
FIG. 4 illustrates the case of treatment of separately collected undiluted wastes, free of thiosulfate and containing thiosulfate, namely developer wastes on the one hand and fixing bath/bleach-fixing bath wastes on the other hand.

In a plant for treating wastes as schematically shown in FIG. 4, a daily amount of 2.6 m$^3$ undiluted spent developer solution (waste portion A) as well as 1.4 m$^3$ undiluted spent fixing bath/bleach fixing bath solutions (waste portion B) from the photolabs of the applicant are treated.

The waste portion A contained about 30 kg SO$_3$. The COD value was 52 kg O$_2$. The SO$_3$-content of the waste portion B was about 5 kg. The COD value was 51 kg O$_2$.

In the aeration stations 36 and 37 the waste portions A and B were treated for a time sufficient enough and intensively enough that the SO$_3$-content of the waste portion A was reduced to 4 kg and the COD value wa reduced to substantially zero. The S$_2$O$_3$-content of the waste portion B was reduced by the aeration to about 30 kg, the NH$_4$-N value to about 12 kg and the COD value to about 50 kg O$_2$.

The waste portion B was then subjected to an anodic oxidation in the electrolysis station 39. Said electrolysis station consisted of 12 cells of the type as described in Example 1 in parallel connection. After passing the electrolysis station 39 the SO$_3$-content of the waste portion B was substantially zero, the S$_2$O$_3$-content was about 6 kg and the NH$_4$-N content was about 10 kg. The COD value was 44 kg O$_2$. The waste portion B, withdrawn from electrolysis station 39, was now combined with the waste portion A from the aeration station 36. The total waste of all together 4 m$^3$ contained: about 10 kg SO$_3$/S$_2$O$_3$, about 10 kg NH$_4$-N and having a COD value of 91 kg O$_2$.

The entire waste was now further aerated in the aeration station 43. By this way the COD value was reduced to about 90 kg O$_2$.

In the ozone oxidation tanks 45 and 48 the wastes were subjected to an ozone oxidation until the SO$_3$/S$_2$O$_3$-content was reduced to about zero, the NH$_4$-N value amounted to about 9 kg and the COD value amounted to 20 kg O$_2$. The ozone generator which was used had an output of 4 kg ozone per hour.

From the ozone oxidizing tank 48 the waste was transferred to the electrolysis station 60. Said station consists of 15 cells of the type also used in electrolysis station 34, connected in parallel. During the anodic oxidation, accomplished in electrolysis station 60 the NH$_4$-N value was reduced to about 3 kg and the COD value was reduced to 10 kg.

The waste was then pumped from the electrolysis station 60 into the electrolysis station 39, where the waste was subjected to a cathodic reduction. The waste, which was withdrawn from the electrolysis station 39 contained about 1.6 kg iron. During the cathodic reduction in said electrolysis station, the AOX relevant compounds, which were produced in minor amounts, were to a large extent re-converted into non-relevant inorganic halides. Moreover silver traces were removed and a partial neutralization was obtained.

The waste withdrawn from electrolysis station 39 was then transferred into the neutralization tank 63 in which the waste was brought to a pH of 8. In the filter station 65 iron hydroxide was filtered off. The waste withdrawn from the filter station 65 was free from SO$_3$/S$_2$O$_3$, contained only about 3 kg NH$_4$-N, less than 0.04 kg iron and less than 0.004 kg silver. The COD value amounted to 10 kg O$_2$. Accordingly the waste could be discharged without hesitation together with untreated washing waters into the sewerage system.

In the filter station 65 about 20 kg iron hydroxide were filtered off. In the case of using calcium ions for the precipitation of calcium sulfate most of the SO$_4$ can be precipitated together with said iron hydroxide.

In the present example no exhaust air cleaning was accomplished. However the exhaust air from the aeration stations 36,37 and 43 may be released through the exhaust air cleaner 74 into the atmosphere.

I claim:

1. The method for treatment of liquid photographic processing wastes comprising the steps of:
   a) subjecting said wastes to an oxygen oxidation;
   b) subjecting said wastes to an ozone oxidation;
   c) subjecting said wastes to an anodic after-oxidation and a cathodic reduction; thereafter
   d) neutralizing said wastes; and
   e) filtering said wastes to remove precipitated solids.

2. The method according to claim 1, characterized in that halide ions are removed from said wastes prior to said wastes being subjected to the anodic after-oxidation and the cathodic reduction.

3. The method according to claim 2, characterized in that said removal of halide ions is accomplished by means of an ion exchange resin.

4. The method according to claim 2, characterized in that said removal of halide ions occurs until less than 10% by weight of the original concentration of halide ions is present.

5. The method according to claim 1, characterized in that at least part of said wastes contain thiosulfate, and that the thiosulfate containing wastes are subjected to the anodic oxidation before the ozone oxidation and after the oxygen oxidation.

6. The method according to claim 5, characterized in that thiosulfate containing wastes are subjected to the oxygen oxidation separately from wastes which are essentially free of thiosulfate, and that the thiosulfate containing wastes and said wastes essentially free of thiosulfate are combined after the oxygen oxidation, subjected to a further common oxygen oxidation, and subjected to the ozone oxidation.

7. The apparatus for the accomplishment of the method according to claim 5, comprising storage tanks for collecting the thiosulfate containing wastes and wastes which do not contain thiosulfate; aeration stations for the oxygen oxidation of said wastes; an electrolysis station for the anodic oxidation of the thiosulfate containing wastes; a further aeration station for the oxygen oxidation of the thiosulfate containing wastes, and for the wastes free of thiosulfate; at least one ozone oxidation station for the ozone oxidation of said wastes; an electrolysis station for the anodic oxidation of said wastes; an electrolysis station for the cathodic reduction of said wastes; a neutralization station; and a filtering station for separating the precipitated solids.

8. The apparatus according to claim 7, characterized in that the electrolysis station used for the anodic oxidation of the thiosulfate containing wastes is the electrolysis station used for the cathodic reduction of the thiosulfate containing wastes and the wastes free of thiosulfate.

9. The apparatus according to claim 7, characterized in that it further comprises an ion exchanger between the ozone oxidation station and the electrolysis station for the anodic oxidation of said wastes, for removal of halide ions.

10. The method according to claim 1, characterized in that the oxygen oxidation is accomplished in two or more partial steps.

11. The method according to claim 10, characterized in that the oxygen oxidation is accomplished with compressed air, at least in the first partial step.

12. The method according to claim 1, characterized in that during the oxygen oxidation, said wastes are treated with air or another oxygen containing gas, until 80–90% of the originally present sulfite is oxidized to sulfate.

13. The method according to claim 1, characterized in that the ozone oxidation occurs until the chemical oxidation requirement of said wastes is reduced by at least 70%.

14. The method according to claim 1, characterized in that the ozone oxidation is promoted by the action of ultraviolet light and $H_2O_2$.

15. The method according to claim 1, characterized in that residual oxygen obtained at the ozone oxidation is used for the oxygen oxidation.

16. The method according to claim 1, characterized in that high grade oxygen is used for the oxygen oxidation.

17. The method according to claim 1, characterized in that the anodic after-oxidation and the cathodic reduction are accomplished in at least one electrolytic cell.

18. The method according to claim 17, characterized in that said wastes are directed through electrolytic cells having separate anode and cathode compartments.

19. The method according to claim 18, characterized in that the anode compartment is separated from the cathode department by a diaphragm.

20. The method according to claim 1, characterized in that said wastes are subjected to the cathodic reduction until the level of adsorbable organic halide compounds is below 1 mg/L.

21. The method according to any one of claims 17 or 20, characterized in that the electrolytic cell comprises an anode of titanium, coated with a noble metal.

22. The method according to claim 1, characterized in that at least part of said wastes are acidic, and that the acidic wastes are neutralized by the addition of alkaline substances.

23. The method according to any one of claims 17, 20, or 22, characterized in that the electrolytic cell comprises a graphite cathode.

24. The method according to claim 1, characterized in that the cathodic reduction occurs after the neutralization, and that calcium ions are added to the wastes to precipitate calcium sulfate.

25. The method according to claim 1, characterized in that the ozone oxidation is accomplished by means of ozone produced in an ozone generator, which is fed with oxygen gas.

26. The method according to claim 25, characterized in that said oxygen gas is generated from liquid oxygen.

27. The method according to claim 25, characterized in that said oxygen is generated from compressed air.

28. The method according to claim 25, characterized in that into said oxygen generator residual oxygen is fed, which is obtained at the oxygen oxidation.

29. The apparatus for the accomplishment of the method according to claim 1, which comprises at least one aeration station for the oxygen oxidation of said wastes; at least one ozone oxidation station for the ozone oxidation of said wastes, which are oxidized in the aeration station; at least one electrolysis station for the accomplishment of the anodic after-oxidation; an electrolysis station for the accomplishment of the cathodic reduction; a neutralization station; and a station for removing precipitated solids.

30. The apparatus according to claim 29, characterized in that said apparatus additionally comprises at least one ion exchanger for removing halide ions between the ozone oxidation station and the electrolysis station used for cathodic reduction.

31. The apparatus according to claim 29, characterized in that it further comprises an exhaust air cleaning station for cleaning the waste gases, which are withdrawn from the aeration station.

32. The apparatus according to claim 29, characterized in that it further comprises a precipitating station for precipitating calcium sulfate.

33. The apparatus for the accomplishment of the method according to claim 1 which comprises:
a) means for oxygen oxidizing said wastes;
b) means for ozone oxidizing said wastes;
c) means for anodically oxidizing said wastes;
d) means for cathodically reducing said wastes;
e) means for neutralizing said wastes; and
f) means for removing precipitated solids from said wastes.

34. The method for treatment of liquid photographic processing waste comprising the steps of:
a) oxidizing said waste by exposing it to oxygen;
b) oxidizing said waste by exposing it to ozone;
c) oxidizing said waste by exposing it to an anode;
d) reducing said waste by exposing it to a cathode; thereafter
e) neutralizing said waste; and
f) filtering said waste to remove precipitated solids.

35. The method for treatment of liquid photographic processing waste comprising the steps of:
a) oxidizing said waste in the presence of oxygen;
b) oxidizing said waste in the presence of ozone;
c) removing halide ions from the oxidized waste;
d) after removal of the halide ions, further oxidizing said waste in the presence of an anode, and reducing said waste in the presence of a cathode; thereafter
e) neutralizing said waste; and
f) filtering said waste to remove precipitated solids.

* * * * *